United States Patent [19]
Lovett et al.

[11] Patent Number: 5,590,192
[45] Date of Patent: Dec. 31, 1996

[54] SMART DISK SOFTWARE PROTECTION SYSTEM

[76] Inventors: Donna M. Lovett; Robert R. Lovett, both of 1304 S. Linden St., Wichita, Kans. 67207

[21] Appl. No.: 339,587

[22] Filed: Nov. 14, 1994

[51] Int. Cl.⁶ ...................................................... H04L 9/00
[52] U.S. Cl. .................................................. 380/4; 360/60
[58] Field of Search ............................... 380/4, 3; 360/60

[56] References Cited

U.S. PATENT DOCUMENTS

| | | | |
|---|---|---|---|
| 4,672,182 | 6/1987 | Hirokawa | 235/436 |
| 5,267,311 | 11/1993 | Bakhoum | 380/4 |
| 5,341,421 | 8/1994 | Ugon | 380/4 |

*Primary Examiner*—Thomas H. Tarcza
*Assistant Examiner*—Pinchus M. Laufer
*Attorney, Agent, or Firm*—Bradley P. Sylvester

[57] ABSTRACT

A floppy disk, having a microprocessor and battery power supply, a magnetic field sensor, and an on switch on the central hub. A plurality of magnetic fields are placed on the disk housing, in a circular pattern around the disk's axis of rotation, and are detected using a magnetic field sensor located on the hub. When the floppy disk is placed into the computer's drive bay, the computer disk drive motor does an initial series of operating and idle time increments. The floppy disk magnetic field sensor detects the number of revolutions of the disk, and stores the revolutions per time increment. The computer then communicates with the floppy disk, using disk motor operation and idle times. The floppy disk communicates information to the computer, via the user who reads information on a LCD readout, located on the floppy disk, and types in the information on the computer keyboard. The floppy disk is used as a personalized key, for both installing and updating programs for continued use.

12 Claims, 2 Drawing Sheets

SMART DISK SOFTWARE PROTECTION SYSTEM

BACKGROUND OF THE INVENTION

There has been a great deal of effort made to prevent the unauthorized transfer or use of software. The efforts are often directed toward three main areas of concern for software developers. The first concern is to create a security means that cannot be easily determined or circumvented by end users. The second concern, is to create a security system that can be inexpensively manufactured and yet operate on a software program that has many identical copies. A third concern, is to create a security system that offers protection for software that is sold or distributed through computer networks.

Prior methods of protection from unauthorized software use, have involved supplying the user with a set of passwords, that are designed to respond to specific queries from the software, prior to use. If the user has the proper answer to the query, then use is authorized. These methods are easily circumvented, by simply transferring the set of passwords, and to which query they respond, on to unauthorized users.

Sophisticated methods have also been implemented, in an effort to restrict software access. U.S. Pat. No. 4,683,968 (Appelbaum et al) described a system in which a portion or all of the software was encrypted in code form. When a user requested access to the software, the computer underwent several steps, including communicating with a software protection module, to determine if the proper access code was available. The software protection module contained a unique code that allowed the computer to perform a decryption procedure on the protected software. Each module was preprogrammed with a unique code, and constructed in such a manner, so that any physical tampering would irrevocably damage it. One of the drawbacks to this system, was that the unique code was placed into the module at the time of manufacturing, which made the process more difficult and costly. Also, there was an undesired time delay while the application was decrypted.

Using software encryption as a means of keeping the software protected, was also used in U.S. Pat. No. 4,187,140 (Chandra). In this invention, the software was broken down into an encrypted form, and the decryption could only take place when a physically secure token transferred the key to the computer. The user could make as many backup copies of the program as they wanted, but since the software remained encrypted, the copies were unusable unless the decrypt token was also present.

Hardware devices continue to play an important role in protecting software, but the hardware devices must have the security code placed in the hardware unit prior to shipping. This creates higher production costs. In U.S. Pat. No. 5,081,676 (Chou), a hardware device was used, in which a permanent first key was placed. A second key, contained in either the same hardware or the software was used, in conjunction with the first key, so that a control key could be established.

In U.S. Pat. No. 5,182,770 (Medveczky), a system was disclosed, in which two separate identification codes were used. One of the codes was associated with the application program, and the other code associated with a hardware unit. The various codes were derived from the software serial number, and a code placed into a connecting hardware unit. Using both of these different codes, a security access code was able to be verified.

A similar approach was done in U.S. Pat. No. 5,222,133 (Chou), in which a plug-in hardware device contained a single or set of unique first keys. A second key was used with the first unique key to derive a control key. Identical copies of software were protected together with the hardware devices, with each software application having its own hardware protection device.

The problems with the prior art is that unique codes or keys had to be placed into various hardware devices, prior to their distribution. The method of protection was ensured, only if each permanent key was unlike any other, or was designed so as to work with only one type of program. Previous hardware devices, while interacting with the software, have been required to be physically connected to the computer system, such as a communications port of a computer. These unique codes had to remain intact, with regard to any codes included in the software, since software was generally copied at the point of manufacture, and sold to the end user on a diskette or other memory storage media. If the hardware did not have a unique code, then the protection would be easily circumvented.

Further use of the hardware was generally limited by the number or type of permanent codes it had. Update programs had to be anticipated, at the time of the hardware unit's manufacture, or a new hardware unit would have to be included with unanticipated updates and new applications.

Efforts have been made, to have codes that were preselected, and assigned a specific unit of time in which the code would operate as an access code. In U.S. Pat. No. 5,168,520 (Weis), a hardware device contained a set of codes that were individually selected as access codes, according to a specific time interval given in the hardware programming.

Other methods have used a personalized identification number (PIN) that the user obtained from the manufacturer, similar to a number used to gain money from a bank machine using a credit card. The overriding problem with this type of method was that the protection obtained from the use of a PIN was lost, once the PIN was disclosed to others.

As the "information highway" continues to grow, computer services and sales of software are now able to be accomplished using modems and communication network computers. One of the benefits of increased computer/modem activity, is that sales and transfer of information can be accomplished without the need to inject physical storage devices, such as program disks into commerce. The middleman is rapidly becoming a network computer, rather than a physical store.

With so much information available through network systems, it is common practice for users of various services to download programs from a network system, and be able to use the software without paying for anything more than phone time and log on time with the computer network system. The software designers lose profits, and there is a decrease in incentives to create more software. Use of a PIN to give protection has obvious shortcomings, since network users are able to transfer both the software and the PIN along to other users of the computer network.

The protection necessary for software distributed over network computer systems, requires an access key, that can be individually mass produced, but is linked to a single software program at the time of the software's installation. In addition, communication between the computer and the access key should include a means whereby the user cannot easily ascertain all of the information being transferred.

SUMMARY OF THE INVENTION

It is an object of this invention to provide a software protection system where a smart disk ("SD") and a software application are encoded with a shared set of code variables and corresponding code symbols, which provide coded information exchange between the SD and the software, either at the time of manufacture, or distribution/availability of the software to consumers.

It is a further object of this present invention to provide a software protection system where a SD is equipped with a means to sense the spinning rotation of the disk drive motor, by the number of revolutions, and/or the passage of time the disk is spinning.

It is a further object of this present invention to provide a means where a single SD is linked to a single software application, at the time of the software's first use or installation into the computer memory.

It is a further object of this present invention to provide a software protection system, that can provide protection to more than one program at a time.

It is a further object of this present invention to provide a software protection system, that requires additional use of the SD, to update the protected software, at various time or use intervals.

It is a further object of this present invention to provide a means where the computer system, containing the software, can communicate with the SD through alternately spinning and stopping the disk with the disk drive motor.

It is a further object of this present invention to provide a software protection system, that allows a SD to store encoded information, received from the computer system, and display information to the user, for transfer back into the computer using the keyboard.

In a broad aspect, this invention relates to a floppy disk that can be identically mass-produced, yet be individualized as a smart disk, for use as an install and update key for a specific program.

The smart disk ("SD") has many components similar to a standard floppy disk. The SD, however, has a hub that contains: a microprocessor; a battery power supply; a magnetic field sensor; and an on switch for the microprocessor. A liquid crystal display ("LCD") is fixed to the hub's outer side walls, and horizontally wraps around the periphery of the hub.

A mylar disk is fixed to the hub, and is contained within a disk housing. The disk housing has an upper and lower portion, that when joined together, enclose and protect the mylar disk. The lower portion of the disk housing has a cavity, that the hub and LCD fit within, and is able to rotate while in the cavity. The LCD is radially arranged around the hub, and is placed so that it does not extend outward from the disk's axis of rotation into the area traditionally occupied by that portion of the mylar disk that is exposed once the metal shutter is pushed aside.

Previously, the hub has been constructed of metal, and has a notch that allows a drive tab to engage to allow the drive motor to spin the disk. The SD may have a plastic hub, with the included components situated within, sealed in the plastic during the hub's formation. The plastic materials, instead of metal, can assist in the operation of the SD's magnetic field sensor.

The disk housing contains one or more magnetic fields, that are situated within the space defined by the upper and lower portions, when joined together. The magnetic fields are located, in relationship to the hub, so that when the hub is spinning, the magnetic field sensor will pass close enough to the magnetic fields, so that they can be detected. Each time the hub's magnetic field sensor passes by a magnetic field, this information is input into the microprocessor, which determines and records the amount or number of rotations of the hub, in relation to the disk housing.

When a floppy disk is placed into the computer's drive bay, the metal shutter is pushed aside to expose the mylar disk. The disk motor begins to spin the disk. Generally, most floppy disk drives spin the disk in excess of 300 revolutions per minute, since most read/write heads are not designed to operate on a disk until the disk is up to its full speed of 300 plus revolutions per minute.

Since various computer disk drive systems may have different spin speeds, and acceleration time factors, the SD needs to make a spin speed/time determination. When the SD is inserted into the disk drive, a command within the program being installed instructs the computer disk drive motor to do an initial series of operating and idle time increments, or data writing or reading operations. For example, the computer disk drive would be instructed to spin for one second, stop for one second, spin for two seconds, stop for two seconds, and so on, until an upper spin time is reached. Each time period the floppy disk is spun, or at rest, or data is written or read, the magnetic field sensor detects the number of revolutions of the disk, and determines the revolutions per time increment. In this manner, the SD can take into account different average spin rates for different times, caused by the lower spin rate during the acceleration time period.

Once the number of spin revolutions for specified time increments are determined, then the computer can communicate with the SD, using disk motor run and stop or idle times. The SD communicates information to the computer via the user, who reads information on a LCD readout, and types in the information on the computer keyboard.

The SD is used to both install software programs, and as an update protection system. The SD and the software program have a set of code variables and corresponding code symbols encoded, prior to interaction between them. Generally, the SD would receive this information at its point of manufacture, with the software receiving the identical information prior to the time it is made available for distribution. If the software is being distributed on diskettes, then the code information would be encoded at time of manufacture. If the software is being distributed through a computer network system, then the code information would be encrypted within the program itself.

Prior to completing the installation of a protected software program, the SD randomly selects an algorithm, that is identified by an operation code. The algorithm is performed on the set of code symbols and code variables so that an identical code key is created in both the SD and the software in the computer system. This code key will be unknown to the user, and individualized to the particular software and SD.

The computer communicates information to the SD, using disk motor run and stop times. The disk motor spins the disk for specific time periods, and stops spinning for specific time periods, and continues running and stopping. The SD's magnetic field sensor detects the run and stop times, and decodes/translates the information into a first code, and a second code, which are stored in the SD's microprocessor memory. When this is done, the SD will erase any prior numbers or codes used for prior installations, so that the SD can only be linked to that particular software program that is currently being installed.

The first code is immediately displayed on the SD's LCD, but can not be determined through the computer system. The second code is not available for display on either the SD or the computer system, until an update is required. Updates are required according to the software manufacturer's design, which can require updates after a preset number of software uses, time of software use, or the passage of actual time. The first code is used for comparison with the first code of the SD, that is displayed on the SD's LCD, which is viewed and typed into the computer for verification. The second and any future codes function as serial identification numbers for locked files on the computer hard disk drive.

After the SD has received and stored the first and second codes, the computer instructs the user to take the SD out of the drive area, and type the information shown on the LCD into the computer, using the keyboard. The information shown on the LCD will be the first code. When the user types in this information, the computer verifies the information received, to see if it matches the information given by the computer to the SD using the floppy disk drive's run/stop times. If the information typed in by the user matches, then the computer allows complete installation and use of the software program. This comparison also allows the computer to verify that it is dealing with the same SD that it previously communicated information to.

After a predetermined time period has passed, the computer determines that it will not allow access to the software program, unless it receives the proper update code. The computer will instruct the user to insert the SD into the computer floppy disk drive. Once the SD is inserted, the computer determines a new update code and transfers this information to the SD using the floppy drive's run/stop method. The SD receives the new update code, and writes it over the file storing the code previously typed into the computer for comparison. (In this case of a first update, the first code is overwritten, since it was previously used to install the program.) As the SD receives additional update codes, it will store them, by overwriting the new information in the first code file, or the second code file, alternating back and forth, so that the information already used is the information overwritten.

After the SD receives a new update code, the LCD displays the other update code that it previously received. (In this case, during a first update, it will be the second code.) The user is instructed to type in this information, using the computer keyboard. Once the computer receives this information, it will be able to use the information as the identification serial number to unlock an update file, and release the update file, supplying the software program with the necessary data that allows continued use of the software. Once this is accomplished, the computer erases the update file on the hard drive that it just released information from.

The newly generated update code is not accessible until a future update is required by the software. The newly generated update code functions as a new identification serial number for a locked file, which is put on the computer hard disk drive. Once this is done, the computer erases the new update code in its random access memory (RAM). The SD and computer will go through identical steps, as indicated above, with a new update code being generated at each update request. The SD will continue to write the new update code over the update code already used, prior to disclosing the unused update code to the user.

If the SD is used to install another identical software program, it will erase all update number information during the install process, so that it cannot be used again with the former identical program. When the former identical program requires an update, it will not have a SD with the necessary information available to complete the update.

The SD can be used to protect several different types or numbers of non identical software programs at one time. The protection can extend to any type of electrically transmitted data, using binary code, such as software programs, movies, games, or any type of electrical data that can be downloaded from computer systems using modems or other data transfer means. The required matching algorithms must be stored within the SD's microprocessor, and the software or data sought to be protected. Selection of which program is being protected can be made by the computer floppy disk drive, using a short identifying run and stop time code, prior to communication of update code information.

DESCRIPTION OF THE PREFERRED EMBODIMENT

This invention is intended to provide protection for any kind of electronically transmitted data, comprising software programs, visual input information, audio input information, and any type of data that is capable of being transmitted using modems, or disk-type storage and transfer. Typically, the invention would have a primary use for protecting software programs, that are installed using diskettes, or downloaded using modems from computer networks. The discussion of the preferred embodiment shows use of the invention with a software program, but the same type of use and steps of use would apply to other forms of electronic data.

Figure 1:
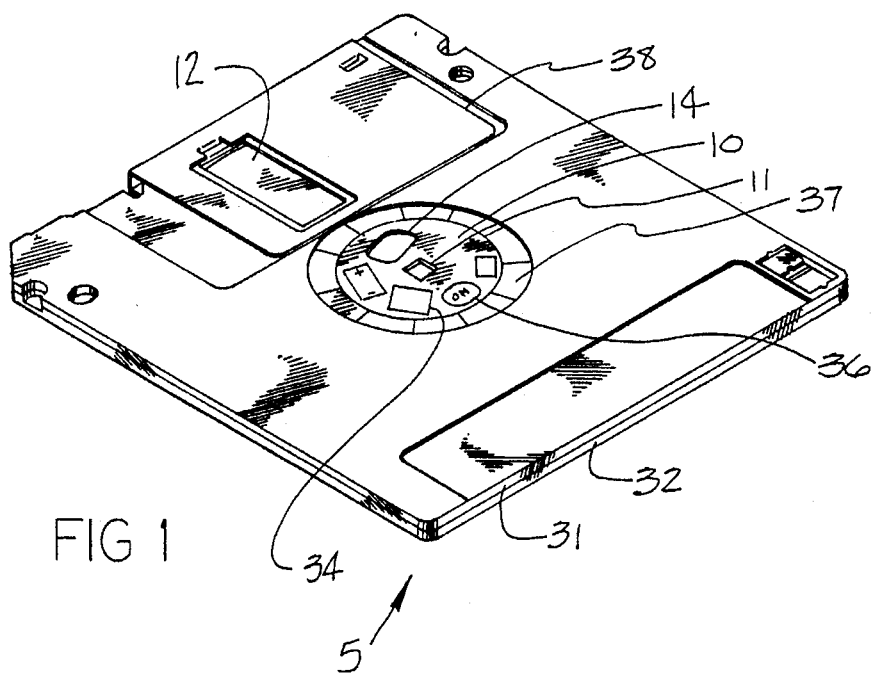
FIG. 1 is a bottom view of the Smart Disk (SD), showing the disk housing and the floppy disk.
Figure 2:
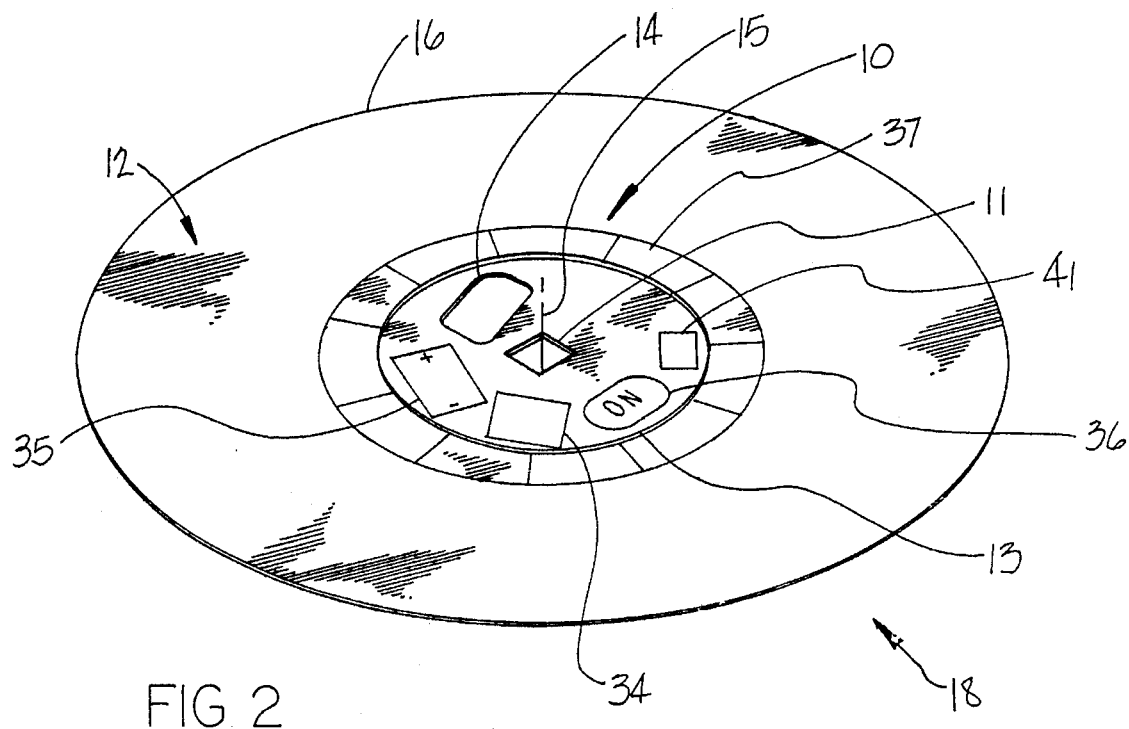
FIG. 2 is a perspective view showing the top of the floppy disk and hub.

Referring to FIG. 1 and FIG. 2, a smart disk ("SD") 5, depicting a disk housing, having an upper portion 32 and a lower portion 31 that contains a floppy disk 18, with a hub 10, that is circular in shape, and a mylar disk 12, fixed to the hub 10. Side walls 13 extend vertically upward, along the peripheral edges of the hub 10.

The central area of the hub 10 defines a spindle hole 11, designating the axis of rotation 15 when the floppy disk 18 is spinning. The flat portion of the hub 10 also defines a notch 14, that a tab on a floppy disk drive motor (not shown) engages to urge the floppy disk 18 to spin.

Referring to FIG. 2, which shows the top side of the hub 10, a microprocessor 34 and magnetic field sensor 41 are located on top portion of the hub 10. The microprocessor 34 receives data from the magnetic field sensor 41, and is powered by a battery power supply 35, which is also located on the top portion of the hub 10. An on switch 36 activates the microprocessor 34 and magnetic field sensor 41. The items on the top side of the hub are of a thickness, so that they do not exceed the height of the hub's side walls 13. Preferably, the battery power source 35, microprocessor 34, magnetic field sensor 41, and on switch 36 are positioned on the hub so that when the hub 10 is rotated or spun, the centrifugal forces will not cause the hub 10 to be out of balance, or cause it to move erratically during the spinning inside a disk drive (not shown).

A flat mylar disk 12 is fixed to the hub 10, along the side walls 13. The mylar disk 12 extends radially outward from the hub 10, with its peripheral edge 16 forming a circle. The mylar disk 12 can contain data, in the form of ordered magnetized particles, that a computer system, having a read/write head on a disk drive can detect, and convert into binary code.

Figure 3:
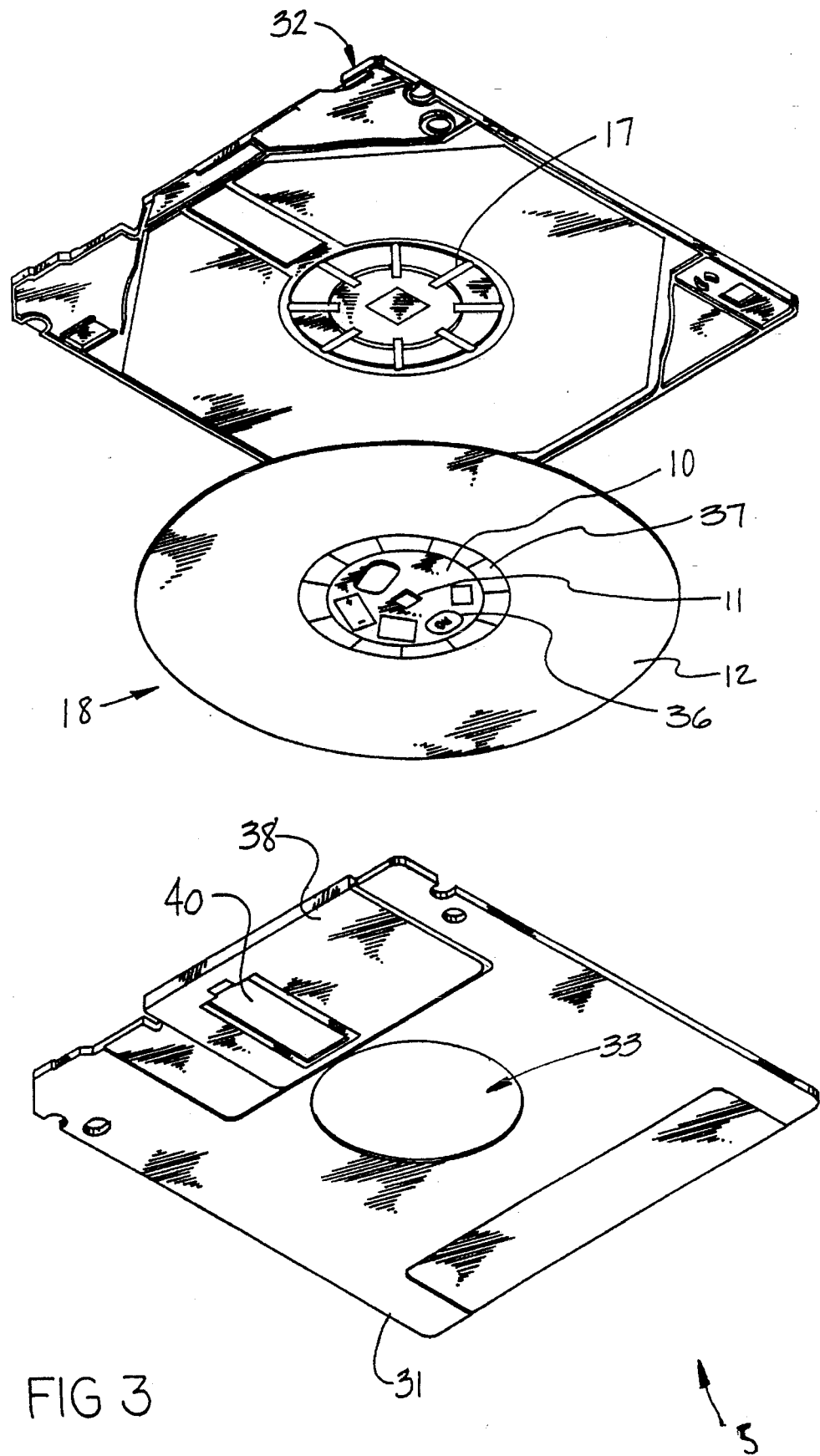
FIG. 3 is an exploded bottom perspective view of the SD, showing the floppy disk between the top portion and bottom portion of the disk housing.

Referring also to FIG. 3, located on the top portion 32 of the disk housing, are one or more magnetic field areas 17. These magnetic field areas 17 are positioned, so that they are detectable using the magnetic field sensor 41, positioned in close proximity with the hub 10. The magnetic field areas 17 have discernable boundaries, so that a particular magnetic field area 17 can be detected when the hub 10 is spinning about the axis of rotation 15.

The hub 10, is traditionally constructed of metal in normal floppy disks, but it may be preferable that it be constructed out of a non magnetic material, such as plastic or other substance capable of withstanding the stress of rapid rotation. If a plastic material is used, the battery power source 35, microprocessor 34, on switch 36, and magnetic field sensor 41, can all be located inside the material, so that they would be protected from external physical touches. The battery power source 35 may be removable, but preferably it will be permanently fixed or sealed within the hub 10.

Referring also to FIG. 3 the SD 5 has a disk housing comprising a top portion 32 and a bottom portion 31, that when joined together, surround and protect the floppy disk 18. The lower disk housing 31, defines a cavity 33, that can accommodate the hub 10, allowing it to freely spin within the cavity 33.

A metal shutter 38, having a cut out 40, is pushed sideways when the SD 5 is inserted in a disk drive. As the metal shutter 38 moves to one side, the cutout 40 exposes the mylar disk 12. Once the mylar disk 12 is exposed, and the disk is spun to the appropriate speed, a disk drive read/write head is positioned near the surface of the mylar disk 12, and can read or write information onto the mylar disk 12.

The microprocessor 34 has encoded within it code variables and corresponding code symbols. The identical information is likewise encoded in the software sought to be protected. Generally, the SD 5 would receive this information at its point of manufacture, with the software receiving the identical information prior to the time it is made available for distribution. If the software is being distributed on diskettes, then the code information would be encoded at time of manufacture. If the software is being distributed through a computer network system, then the code information would be encrypted within the program itself.

The code variables comprise various run and stop times, that instruct a disk drive to operate, and cease operation for various lengths of time. The code symbols and code variables may comprise additional symbols and/or variables. Whatever the amount of code symbols and code variables being used, it is necessary that both the SD 5 and the software have this identical information encoded within each of them.

A liquid crystal display ("LCD") 37 surrounds the hub 10, and extends radially outward from the side walls 13, but does not extend into the area occupied by the metal shutter 38 or cutout 40. The LCD 37 occupies the area where a lip protrudes outward from the side walls 13 of a typical hub 10, and has a plurality of readout areas, so that one or more symbols or numbers can be displayed. The LCD 37 may have a fixed point of reference, indicating to the viewer where the data display begin, or the LCD 37 may have a floating point of reference, which is selected according to the algorithm that is being used, and indicated when data is displayed.

Magnetic field areas 17 can be positioned on the bottom portion 31 or top portion 32 of the disk housing, provided that they are situated near the area that the hub 10 is located, so that the magnetic field sensor 41 can detect them when the hub 10 is spinning. The magnetic field sensor 41 is situated near the side walls 13 of the hub 10 and operates on the same principles as a read/write head on an ordinary disk drive, which is well known in the field. The magnetic field sensor 41 is designed to only detect the presence of magnetic field areas 17 that are located on the bottom portion 31 or top portion 32 of the disk housing.

When the hub 10 is spinning around the disk's axis of rotation 15, within the cavity 33 of the bottom portion 31, the magnetic field sensor 41 will pass in close proximity to the magnetic field 17. Each time the magnetic field sensor 41 passes by a magnetic field 17, it is detected, and this information is input into the microprocessor 34, which determines the amount or number of rotations of the hub 10, in relation to the disk housing.

This detection of rotation allows the SD 5 to receive information from the computer, using the amount of rotations, or time of rotation, of the disk drive motor. The computer's disk drive operates and spins the SD 5 in the same fashion as it would any other type of floppy disk, so that any computer currently on the market can communicate with the SD 5.

Typically, when a floppy disk is placed into the computer drive bay, the metal shutter 38 is pushed aside to expose the mylar disk 12 through the cutout 40. The disk motor (not shown) engages the hub 10, with a motor tab (not shown) extending through the notch 14. The motor will then begin to spin the floppy disk 18, until a proper operating speed is achieved. Generally, most floppy disk drives spin the disk in excess of 300 revolutions per minute, and most read/write heads are not designed to operate on a disk until the disk is up to its full speed. Full speed should be at least 300 to 360 revolutions per minute.

Since various computer disk drive systems may have different spin speeds, whenever the SD 5 is used, a command first orders a determination of the spin rate of the disk drive in proportion to various time increments. These commands can be located on the mylar disk 12, or in the software, and is input into the computer system through standard methods.

When the SD 5 is inserted into the disk drive, the computer instructs the computer disk drive motor to do an initial series of operating and idle time increments. Each time period the hub 10 is spun, the magnetic field sensor 41 detects the number of revolutions of the floppy disk 18, and stores the revolutions per time increment. This check can be performed using actual time increments, or a series of data transfers that are written onto the mylar disk 12, and then read off of the mylar disk 12, with the computer system and SD 5 clocking the data transfer times to double check the spin rate of the disk drive motor.

Once the number of spin revolutions for specified time increments are determined, the computer can communicate with the SD 5, using disk motor run and stop or idle times. The SD 5 can communicate information to the computer via the user, who reads information displayed on the LCD 37, and types in the information on the computer keyboard.

When a protected software program is installed, or later updated, use of the SD 5 is always required. Both the software and the SD 5 become individualized to one another through a series of steps that takes place during the initial installation of the software. Only the same SD 5 will be usable for future updates on the software.

During the initial installation of the software, the SD 5 randomly selects an algorithm, using an identification code. The user is instructed to view the LCD 37, and type in the displayed information into the computer. The LCD 37, being circular in shape, will indicate a point that the user is to begin reading the information from the circular LCD 37. An algorithm inside the SD 5 and the computer will select and identify the point the user is to begin reading information from the LCD 37. The code symbols and code variables, that are encoded in both the SD 5 and the software provide a starting data set, which after algorithmic steps are performed on it, becomes a key code, individualizing the SD 5 and a single software to each other. An example of a starting data set is shown below in Table A.

TABLE A

| CODE SYMBOLS/NUMBERS | RUN TIMES (in sec.) | STOP TIMES (in sec.) |
|---|---|---|
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |
| 8 | 8 | 1 |
| 9 | 9 | 1 |
| 0 | 5 | 5 |
| A | 4 | 2 |
| B | 1 | 2 |
| C | 1 | 3 |
| D | 1 | 4 |
| E | 1 | 5 |
| F | 1 | 6 |
| G | 1 | 7 |
| H | 1 | 8 |
| I | 1 | 9 |
| J | 4 | 3 |
| K | 2 | 2 |
| L | 2 | 4 |
| M | 2 | 4 |
| N | 2 | 5 |
| O | 2 | 6 |
| P | 2 | 7 |
| Q | 2 | 8 |
| R | 2 | 9 |
| S | 4 | 5 |
| T | 3 | 2 |
| U | 3 | 3 |
| V | 3 | 4 |
| W | 3 | 5 |
| X | 3 | 6 |
| Y | 3 | 7 |
| Z | 3 | 8 |

Both the SD 5 and the computer perform the algorithmic steps on the starting data set of code symbols and code variables, so that an identical code key is created in both the SD 5 and the software in the computer system. The algorithmic steps can take any form whatsoever. Table B, shown below, shows an exampled new code key, created from the starting data, in which the positions of the code symbols of the starting data, as shown in Table A, have been altered:

TABLE B

| CODE SYMBOLS/NUMBERS | RUN TIMES (in sec.) | STOP TIMES (in sec.) |
|---|---|---|
| C | 1 | 1 |
| K | 2 | 1 |
| 8 | 3 | 1 |
| N | 4 | 1 |

TABLE B-continued

| CODE SYMBOLS/NUMBERS | RUN TIMES (in sec.) | STOP TIMES (in sec.) |
|---|---|---|
| T | 5 | 1 |
| P | 6 | 1 |
| L | 7 | 1 |
| 3 | 8 | 1 |
| H | 9 | 1 |
| S | 5 | 5 |
| X | 4 | 2 |
| J | 1 | 2 |
| 1 | 1 | 3 |
| Q | 1 | 4 |
| G | 1 | 5 |
| O | 1 | 6 |
| E | 1 | 7 |
| 9 | 1 | 8 |
| Y | 1 | 9 |
| B | 4 | 3 |
| 2 | 2 | 2 |
| 7 | 4 | 4 |
| Z | 2 | 4 |
| 4 | 2 | 5 |
| F | 2 | 6 |
| 6 | 2 | 7 |
| D | 2 | 8 |
| W | 2 | 9 |
| 0 | 4 | 5 |
| S | 3 | 2 |
| V | 3 | 3 |
| U | 3 | 4 |
| R | 3 | 5 |
| A | 3 | 6 |
| I | 3 | 7 |
| M | 3 | 8 |

The code key, as exampled above, will be unknown to the user. Since the code key has been created in both the SD 5 and the computer software, it is now individualized to them. The code keys can be created by any number or type of algorithm. The greater number of algorithms there are to choose from, creates an increase in the likelihood of individualizing each SD 5 with a single software program.

The software directs the computer to communicate specific information to the SD 5, using disk motor run and stop times. The disk motor spins the hub 10 for specific time periods, and stops spinning for specific time periods, and continues running and stopping. The SD's 5 magnetic field sensor 41 detects the run and stop times, and decodes/translates the information into a first code, and a second code which are stored in the SD's 5 microprocessor 34 memory.

Referring also to TABLE B, when the magnetic field sensor 41 detects that the hub 10 is operating in the following manner, the microprocessor 34 will compute the spin and stop times, and determine the resulting first code, being 3C6D7P3T2B (as an example).

| SPIN TIME (secs) | STOP TIME (secs) | FIRST CODE |
|---|---|---|
| 8 | 1 | 3 |
| 1 | 1 | C |
| 2 | 7 | 6 |
| 2 | 8 | D |
| 4 | 4 | 7 |
| 6 | 1 | P |
| 8 | 1 | 3 |
| 5 | 1 | T |
| 2 | 2 | 2 |
| 4 | 3 | B |

When this is done during installation of the software program, the computer and the SD 5 will erase any prior numbers or codes used for prior installations, so that the SD 5 can only be linked to that particular software program that is currently being installed. A second code is created in the same manner, with the computer transferring it to the SD 5 using the run and stop times of the disk drive.

After the SD 5 has received and stored the first and second codes, the computer instructs the user to take the SD 5 out of the drive area, and type the information shown on the LCD 37 into the computer, using the keyboard. The information shown on the LCD 37 will be the first code. As exampled above, the first code is 3C6D7P3T2B. When the user types this information into the computer, the computer verifies the information received, to see if it matches the information it gave to the SD 5 using the disk drive's run/stop times. If the information typed in by the user matches, then the computer allows complete installation and use of the software program. This comparison also allows the computer to verify that it is dealing with the same SD 5 that it previously communicated information to.

Updates are required according to the software manufacturer's programming, which can require updates after a preset number of software uses, time of software use, or the passage of actual time. Preferably, after a predetermined time period has passed, the software will not allow further access to it, unless the proper update code is typed into the system. The computer will instruct the user to insert the SD 5 into the drive.

Once the SD 5 is inserted, the computer determines a new update code, and stores it in its RAM, and on the computer hard disk drive, where it is stored as a locked file with a name, but without a discernable serial number. The same information is also communicated to the SD 5 using the disk drive's run/stop method. The SD 5 receives the new update code, and writes it over the file storing the code previously typed into the computer for comparison. (In this case, being the first code, which was used to install the program.)

A time clock, within the microprocessor 34, will not allow the second code, or future update codes to be displayed, until a specified time period has passed. Once the requisite time has passed, and the SD 5 has been given a new update code, the LCD 37 displays the other code that it previously received. (In this case, it will be the "second code" that is displayed.) The user is instructed to type in this information, using the computer keyboard. Once the computer receives this information, it uses it to locate and unlock the update file on its hard drive, which is also the "second code" in this case. The second code unlocks the locked file on the computer hard disk drive, and allows access to data critical for continued use of the protected software. If it matches, the computer releases the previously locked information, and allows continued use of the software. The file, once used, is erased.

All newly generated update codes are not accessible until a future update is required, and the requisite time has passed. At each update, the SD 5 and computer will go through identical steps, as indicated above, with a new update code being generated at each update request. The SD 5 will continue to write the new update code over the last update code used, prior to disclosing the unused update code to the user, so that the microprocessor 34, will alternate between two storage files; one that is accessible, and one that is locked until a future time.

If the SD 5 is used to install another identical software program, the microprocessor 34 automatically erases all update number information dealing with that type of program during the install process, so that it cannot be used again with the former program. When the former identical program requires an update, the SD 5 will no longer work with it for purposes of updating, since it will not have the necessary current update information available to unlock the file on the hard disk in order to complete the update procedure.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

We claim:

1. An electronic data protection device, for protecting any type of electrically transmitted information comprising:
   (a) a disk housing, having a top portion and a bottom portion, with the bottom portion defining a circular cavity;
   (b) a floppy disk, situated between the top portion and bottom portion of the disk housing, having a mylar disk fixed to a hub, where the hub fits and is able to rotate within the bottom portion circular cavity, and contains a microprocessor, a magnetic field sensor, a power supply for the microprocessor, and a switch to activate the microprocessor;
   (c) magnetic field areas, located on the disk housing, so that they are detectable by the magnetic field sensor, when the hub rotates within the bottom portion of the disk housing;
   (d) a display means, fixed to the hub.

2. An electronic data protection device, as claimed in claim 1, in which the hub is constructed out of metal.

3. An electronic data protection device, as claimed in claim 1, in which the hub is constructed out of plastic, with the microprocessor, power supply, and magnetic field sensor sealed within it.

4. An electronic data protection device, as claimed in claim 1, in which the display means is a liquid crystal display.

5. An electronic data protection device, as claimed in claim 1, in which the microprocessor in the software protection device has a set of one or more algorithms, code symbols and corresponding disk run and stop times, with identical information stored in the electronically transmitted information sought to be protected, and which is uniquely altered in the microprocessor and electronically transmitted information, so that following the alterations, they are identical to each other.

6. An electronic data protection device, as claimed in claim 1, that can receive information and data from a computer, using spin and stop times of a floppy disk, when the floppy disk is placed into the computer disk drive and undergoes a series of timed rotations and stop times, during which time magnetic field sensor detects the passage of magnetic field areas, which information the microprocessor receives and interprets to compute the passage of magnetic fields per unit of time during the spinning process, and which the time units comprise the information sent by the computer.

7. An electronic data protection device, as claimed in claim 1, in which the display means displays information for the user, to type into the computer system, using the computer keyboard.

8. An electronic data protection device, as claimed in claim 1, in which the microprocessor has a time clock, that controls when certain information is to be disclosed to the user.

9. An electronic data protection device, as claimed in claim 1, where both the microprocessor and the electronically transmitted information to be protected create a unique first code, that is used to install the electronically transmitted information into a computer system.

10. An electronic data protection device, as claimed in claim 1, where both the microprocessor and the electronically transmitted information create a first code and a second code, that are stored in the microprocessor's memory until either code is needed for an update of the electronically transmitted information, and can create other unique codes required for additional updates.

11. An electronic data protection device, as claimed in claim 1, where the microprocessor's memory can be used to allow protection of more than one electronic data program.

12. An electronic data protection device, as claimed in claim 1, where any type of electronically transmitted information comprises software programs, audio and visual input data, and any data that is transferable using modems or disk storage and transfer.

* * * * *